(12) United States Patent
Hata (10) Patent No.: US 7,686,105 B2
(45) Date of Patent: Mar. 30, 2010

(54) DRILL, WALL PROTECTOR AND DRILLING METHOD

(75) Inventor: Shigeru Hata, Nishinomiya (JP)

(73) Assignee: Nihon Project Co., Ltd. (JP)

( * ) Notice: Subject to any disclaimer, the term of this patent is extended or adjusted under 35 U.S.C. 154(b) by 80 days.

(21) Appl. No.: 11/725,792

(22) Filed: Mar. 20, 2007

(65) Prior Publication Data

US 2007/0235228 A1 Oct. 11, 2007

(30) Foreign Application Priority Data

Mar. 22, 2006 (JP) ............... 2006-078085
Apr. 27, 2006 (JP) ............... 2006-122796

(51) Int. Cl.
*E21B 10/44* (2006.01)

(52) U.S. Cl. .................. 175/394; 408/223

(58) Field of Classification Search .......... 175/415, 175/426, 427, 57, 435, 401, 394, 420.1, 210, 175/220; 408/223, 224, 227, 230
See application file for complete search history.

(56) References Cited

U.S. PATENT DOCUMENTS 3,845,829 A * 11/1974 Schaumann ............... 175/395
4,964,475 A * 10/1990 Fischer ..................... 175/210
6,032,749 A * 3/2000 Bongers-Ambrosius et al. ....................... 175/394
6,474,425 B1 * 11/2002 Truax et al. ................ 175/398
7,189,036 B1 * 3/2007 Watson ....................... 408/204
2005/0000732 A1 * 1/2005 Geuvers et al. .............. 175/57
2006/0032676 A1 * 2/2006 Papousek ................... 175/415
2007/0193780 A1 8/2007 Geuvers et al.

FOREIGN PATENT DOCUMENTS

| DE | 297 15 261 | 10/1997 |
| DE | 103 11 079 | 9/2004 |
| EP | 1 452 256 | 9/2004 |
| GB | 595908 | 12/1947 |
| JP | 2005-279853 | 10/2005 |

* cited by examiner

*Primary Examiner*—Jennifer H Gay
*Assistant Examiner*—James G Sayre
(74) *Attorney, Agent, or Firm*—Gerald E. Hespos (57) ABSTRACT

A drill includes a main body and a high-hard tip attached to a front end of the body. The tip has a width greater than the diameter of the body and has an angular cutting portion. In order to form a hole having a greater distal end in a wall, the tip is attached on the main body in such a way that a cutting point on an axial line of the tip is eccentrically shifted from an axis of the main body. The drill is inserted into a preliminary hole drilled beforehand and cuts a distal end of the preliminary hole to form a hole including an expanded distal end having a greater diameter. Thereby, the expanded distal end hole having a greater distal end can be formed that is capable of increasing the fixity of an anchor far greater.

6 Claims, 8 Drawing Sheets

DRILL, WALL PROTECTOR AND DRILLING METHOD

BACKGROUND OF THE INVENTION

1. Field of the Invention

The present invention relates to a drill attached with a high-hard tip to a front end of a main body, a wall protector for protecting a wall surface when drilling is performed, and a method for drilling a wall.

2. Description of the Related Art

Figure 15:
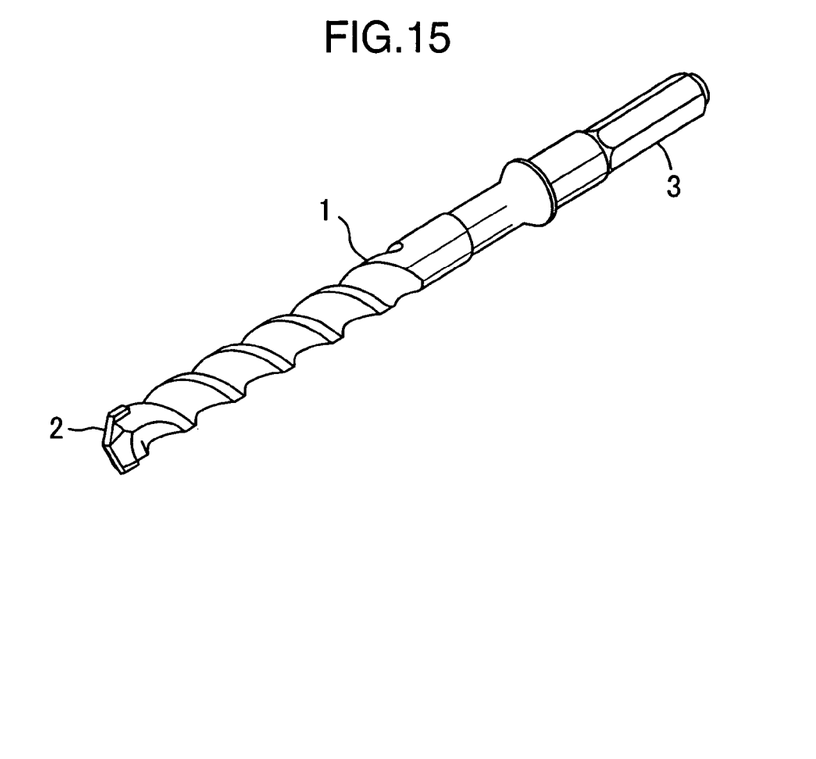
FIG. 15 is a perspective view of a conventional drill.
Figure 16:
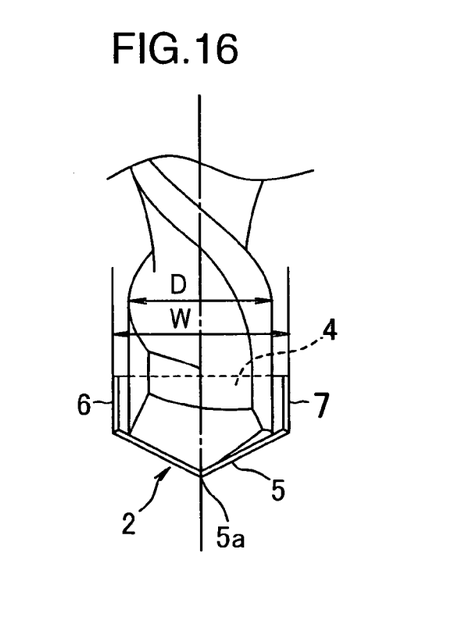
FIG. 16 is an enlarged side view of a front end portion of the drill shown in FIG. 15.

A drill for boring a hole in a wall made of concrete or other wall is attached with, as shown in FIGS. 15 and 16, a high-hard tip 2 on a front end of a main body (i.e., a shank) 1 by means of brazing or the like. This high-hard tip 2 is made of cemented carbide or the like, and is formed into a plate shape which has a width W greater than a diameter D of the main body, i.e., a diameter of a thickest portion. In FIG. 15, reference numeral 3 denotes a chuck portion which is chucked in a drill driver.

The tip 2 includes, in general, at a front end of a base portion 4, an angular cutting portion 5 protruding from the front end of the main body 1 to perform cutting. The tip 2 is attached to the main body 1 so that a vertex (i.e., the cutting point) 5a of the angular cutting portion 5 is located on an axis X of the main body 1.

On both sides of the cutting portion 5, side cutting edges 6, 7 are formed. These side cutting edges 6, 7 protrude equally diametrically outward from the main body 1 in the state where the tip 2 is attached.

The above described drill configuration is disclosed, for example, in Japanese Unexamined Patent Publication No. 2005-279853.

Figure 17:
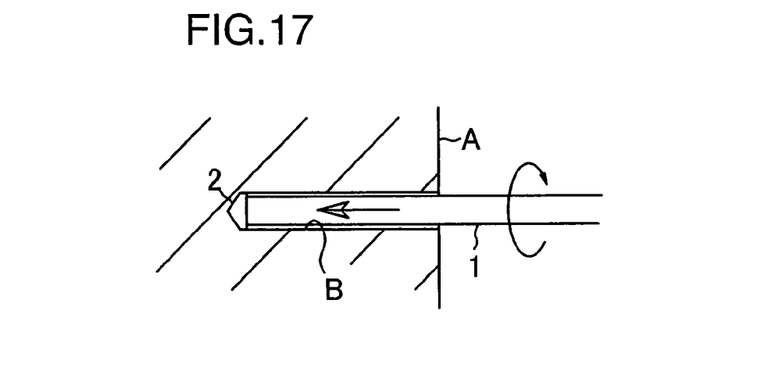
FIG. 17 is an illustration showing drilling using the conventional drill.
Figure 18:
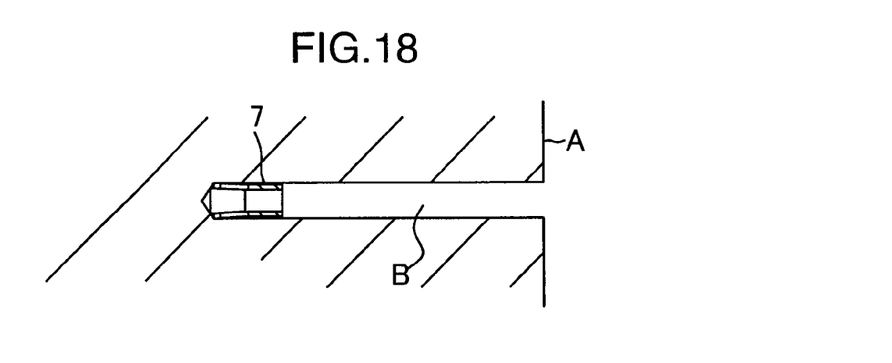
FIG. 18 is an illustration showing a state in which an anchor is fixed in the hole.
Figure 19:
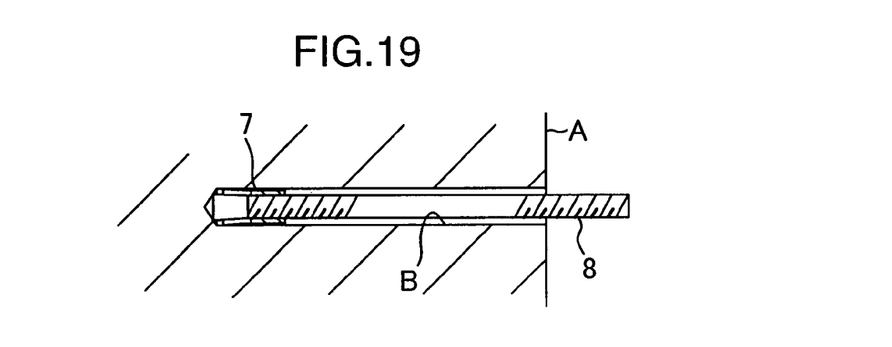
FIG. 19 is an illustration showing a state in which an anchor bolt is attached to the anchor.

Such a conventional drill, as shown in FIGS. 17 to 19, cannot make in a wall A other than a straight hole B whose diameter is uniform over its full length. In FIGS. 17 to 19, for simplification, the main body 1 is illustrated in the form of a round shaft.

In the case where an anchor 7 is inserted, expanded, and fixed in the drilled hole B, and an anchor bolt 8 is screwed in the hole B, and a device or a structural member is attached to the anchor bolt 8 as shown in FIG. 18, for example, there is the problem that the fixing force of the anchor 7 in the hole B is not sufficient, thus making the attachment state of an attached object unstable.

Such problem is not limited to the so-called mechanical anchor method as shown above, but exits in the so-called chemical anchor method where an anchor is fixed by charging a hole with a synthetic resin adhesive agent. There has been the strong demand to solve this problem.

SUMMARY OF THE INVENTION

It is an object of the present invention to provide a drill, a wall protector, and a drilling method which are free from the problems residing in the prior art.

It is another object of the present invention to provide a drill, a wall protector, and a drilling method which make it possible to form a hole capable of increasing the fixity of an anchor much greater.

According to an aspect of the present invention, a drill is provided with a main body, and a high-hard tip attached to a front end of the main body. The tip has a width greater than a diameter of the main body, and an axial line of the tip is shifted in a widthwise direction from an axis of the main body.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS

Embodiments of the present invention will be described with reference to FIGS. 1 to 14. As shown in FIGS. 1 to 7, a drill is attached with a high-hard tip 12 on a front end of a main body 11 by means of brazing or the like. The high-hard tip 12 is made of cemented carbide or the like, and is formed into a plate shape which has a width W greater than a diameter D of the drill 11, i.e., a diameter of a thickest portion.

Figure 1:
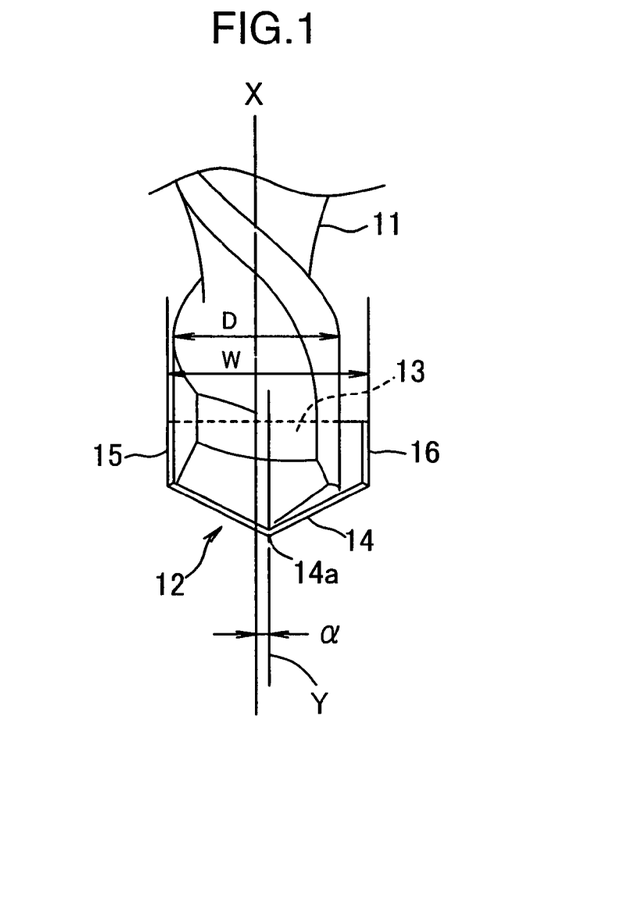
FIG. 1 is a side view of a front end portion of a drill according to a first embodiment of the present invention.

The tip 12 includes, at a front end of a base portion 13, an angular cutting portion 14 protruding from the front end of the main body 11, and serves as a cutting portion. On both sides of the cutting portion 14, side cutting edges 15, 16 are formed.

In this drill, as its unique configuration, the tip 12 is attached to the main body 11 in such a way that an axial line Y (latterly center line) of the tip 12, i.e., a straight line passing a cutting point 14a at a vertex of the cutting portion 14, is shifted a predetermined distance in a widthwise direction from an axis X of the body 11. Reference character α denotes this center-off distance.

Therefore, in the state of the tip 12 being attached, both side cutting edges 15, 16 protrude different gaps outward from the periphery of the main body 11.

For example, in the case where a hole for a mechanical anchor is formed by using a drill having a body diameter D of 16 mm, a tip width W of 20 mm, it was experimentally confirmed that a center-off distance of around 1.0 to 3.0 mm effectively imparted the sufficient fixing force.

Figure 2:
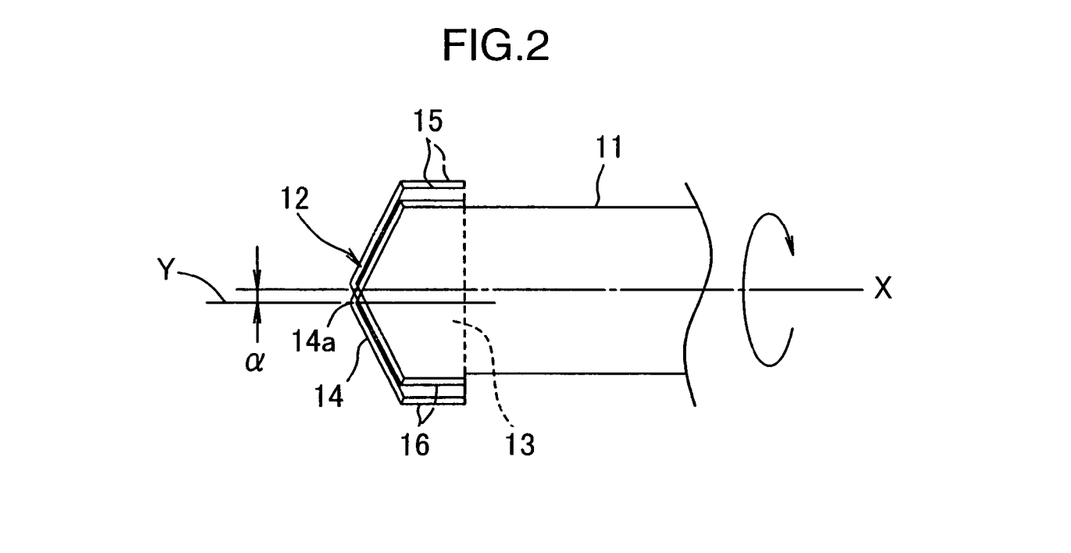
FIG. 2 is an illustration showing an eccentric rotation of the front end portion of the drill.

According to this drill configuration, as shown in FIG. 2, when the drill is being rotated, the tip 12 eccentrically rotates in the state of displacing the center-off distance α in the widthwise direction. This eccentric rotation makes it possible to form a hole whose diameter is greater than the tip width W.

Next, specific operations of the drilling using this drill will be described with reference to a mechanical anchor method. It should be noted that in FIGS. 2, 4 and 5, the main body 11 is schematically shown as a round shaft.

Figure 3:
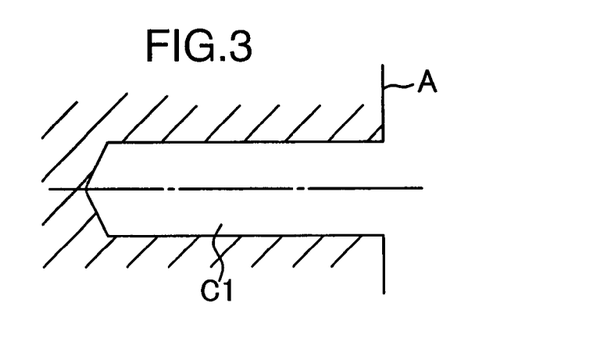
FIG. 3 is an illustration showing a first step of drilling using the drill.

First, as shown in FIG. 3, a straight preliminary hole C1 is formed in a wall A using a conventional straight drill. The hole C1 is slightly shorter than a depth necessary for the anchor attachment.

Figure 4:
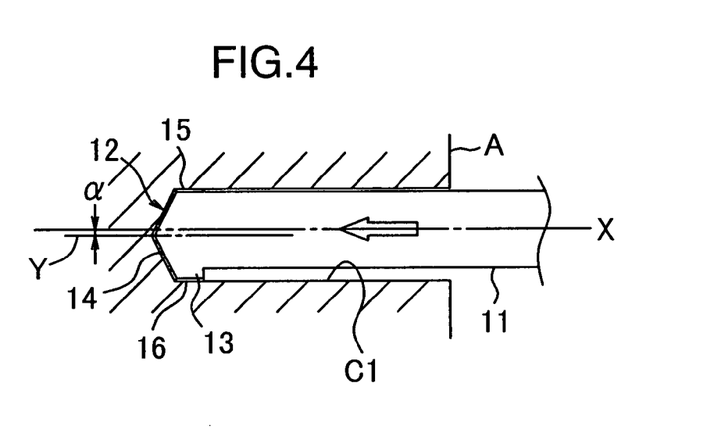
FIG. 4 is an illustration showing a second step of the drilling using the drill.

Next, as shown in FIG. 4, the drill 11 is inserted into the preliminary hole C1, and driven or rotated while pressing the tip 12 onto a distal end surface of the preliminary hole C1.

Figure 5:
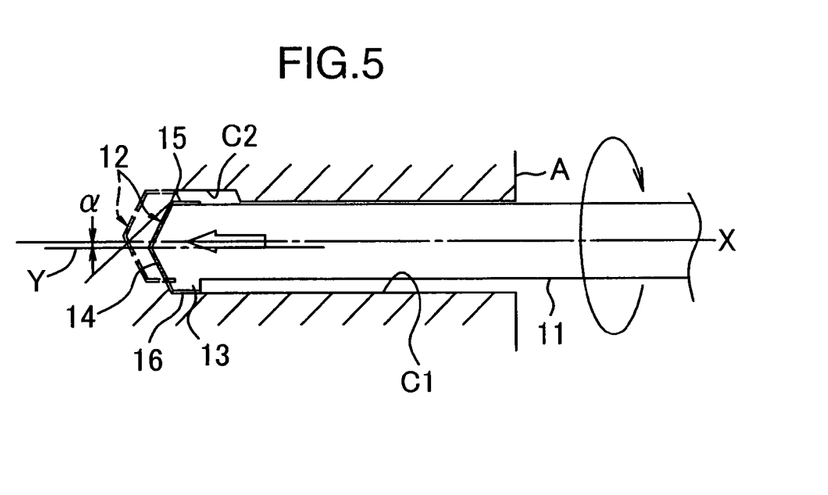
FIG. 5 is an illustration showing a third step of the drilling using the drill.
Figure 6:
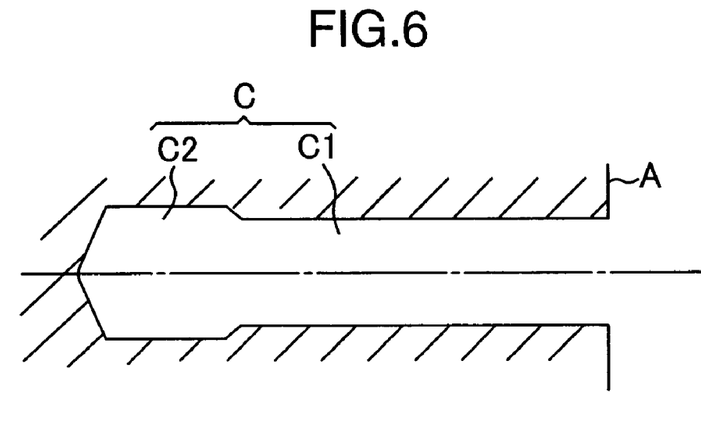
FIG. 6 is an illustration showing a finished state of the drilling.

This second drilling, owing to the eccentric rotation of the tip 12, continuously forms an end hole C2 having a greater diameter than the preliminary hole C1 in a distal end portion of the preliminary hole C1 as shown in FIG. 5, consequently providing an end-expanded hole C having an expanded distal end.

The use of the tip 12 including the angular cutting portion 14 having the vertex (i.e., the cutting point 14a) enables reliable forming of an end-expanded hole C because the cutting point 14a of the angular cutting portion 14 comes into contact with the hole distal end surface to thereby reduce the resistance against the eccentric rotation and ensure smooth eccentric rotation.

Figure 7:
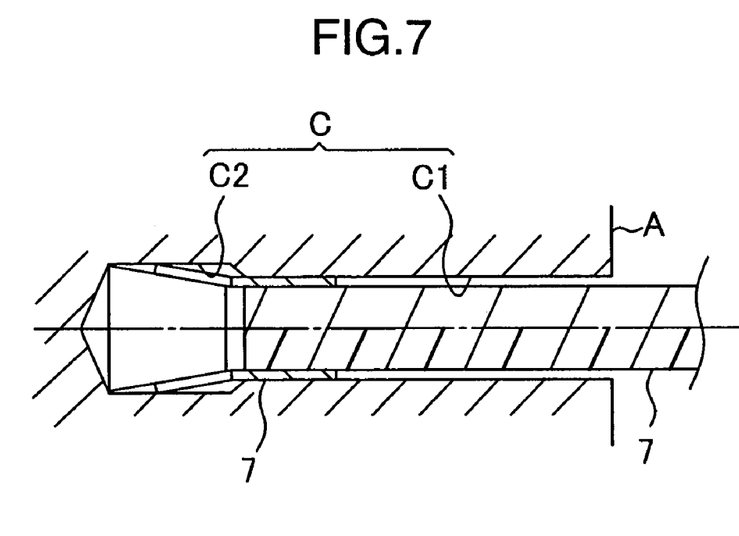
FIG. 7 is an illustration showing a state in which an anchor is fixed in the hole and an anchor bolt is attached.

As shown in FIG. 7, an anchor 7 is inserted and spread in the expanded distal end hole C, so that the anchor 7 spreads greater than the diameter of the preliminary hole C1, and comes into pressing contact with an inner surface of the distal end hole. Thus, the anchor can be reliably fixed.

Therefore, compared with the case where, as shown in FIG. 18, the anchor 7 is fixed by only the contact pressure on the circumferential inner surface of the straight hole B, the expanded distal end hole makes it possible to fix the anchor 7 by the greater fixing force.

Accordingly, as shown in FIG. 7, an anchor bolt 8 which is screwed through the anchor 7 and is attached with a device or a structural member can support it more stably.

The advantageous effects are not limited to the above described mechanical anchor method, and can be attained likewise in the case of a chemical anchor method where an anchor is fixed by charging a hole with a synthetic resin adhesive agent.

Figure 8:
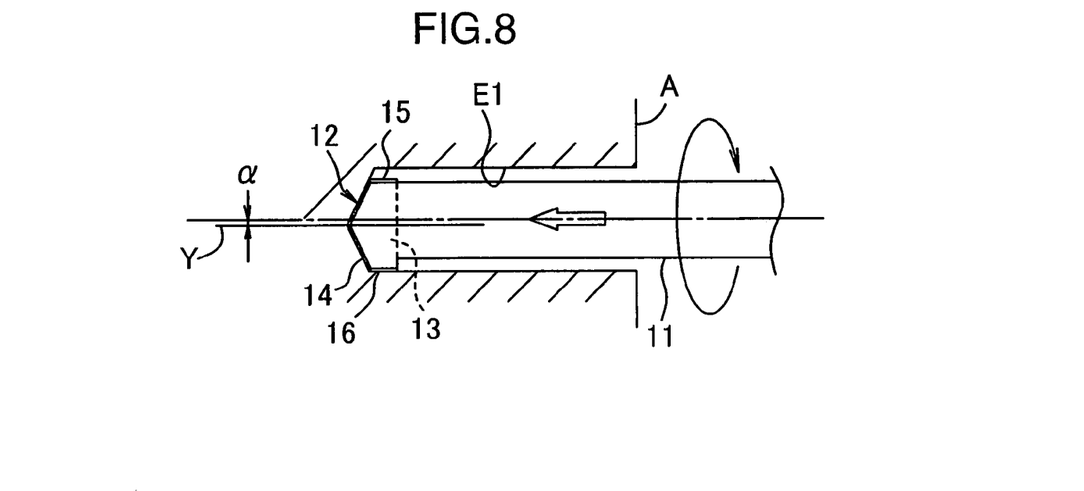
FIG. 8 is an illustration showing a first step of drilling according to a second embodiment of the present invention.
Figure 9:
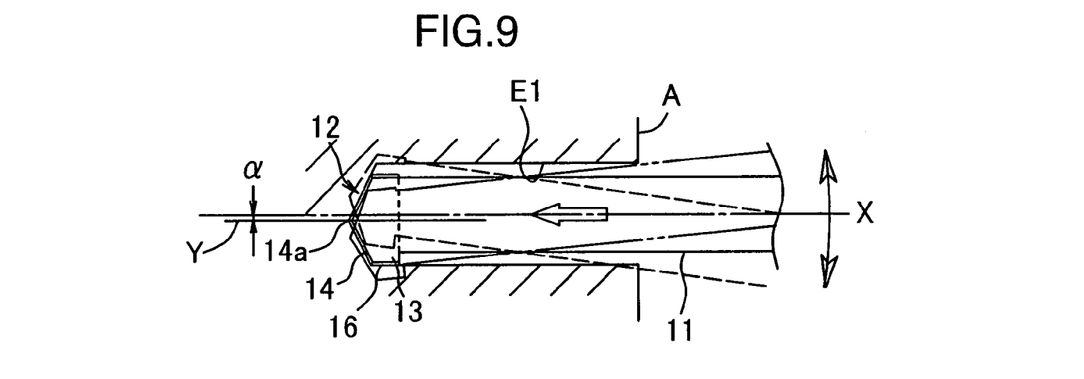
FIG. 9 is an illustration showing a second step of the drilling.
Figure 10:
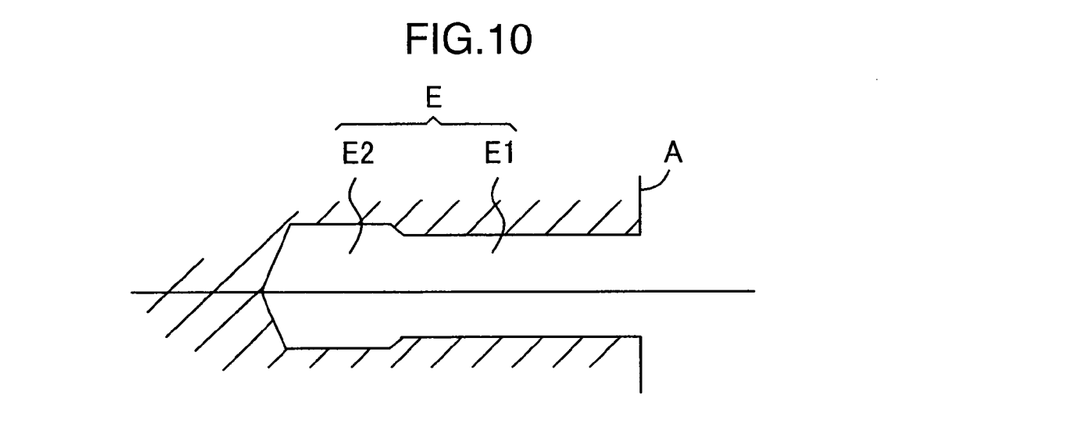
FIG. 10 is an illustration showing a finished state of the drilling.

Next, description is made about a second embodiment of the present invention with reference to FIGS. 8 to 10. The second embodiment refers to another manner of forming an expanded distal end hole. The configuration of a drill itself is the same as that of the first embodiment.

In the first embodiment, the drill is rotated inside of the preliminary hole C1, which has been formed beforehand, to thereby form the distal end hole C2. In contrast, in the second embodiment, as shown in FIG. 8, a straight preliminary hole E1 is directly formed by the drill having the shifted tip 12. Thereafter, as shown in FIG. 9, the body 11 of this drill is inclined with respect to the axis of the preliminary hole E1 or turned along a larger circle around the preliminary hole E1 to thereby form, as shown in FIG. 10, a distal end hole E2 continuously.

This manner forms the distal end hole E2 that has a diameter greater than the straight hole E1. In other words, this manner makes it possible to form an expanded distal end hole E which is basically identical with the one according to the first embodiment.

In the second embodiment, compared with the first embodiment, irregularities are formed in the entire inner surface of the hole because the tip 12 is eccentrically rotated. This is advantageous in increasing the fixing force of the anchor.

Figure 11:
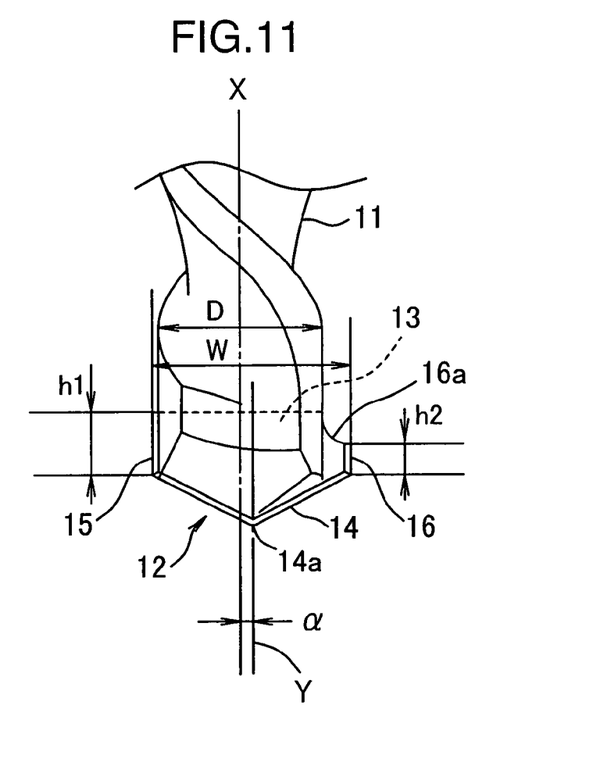
FIG. 11 is a side view of a front end portion of a drill according to a third embodiment of the present invention.

Next, a third embodiment of the present invention will be described with reference to FIGS. 11 to 14. The third embodiment refers to a tip 12 having another configuration. Specifically, the tip 12 of the third embodiment is identical to that of the first embodiment in that:

(I) the tip 12 is configured by providing an angular cutting portion 14 on a front end of a base portion 13;

(II) the tip 12 is eccentrically attached to a main body 11;

(III) side cutting edges 15, 16 are provided on both sides of the cutting portion 14, and protrude outward from the periphery of the main body 11; and (IV) the protruding amounts of the both side cutting edges 15, 16 are different from each other owing to the center-off of the cutting point 14a.

However, in the third embodiment, the side cutting edge 16 having a greater protruding amount than the side cutting edge 15 has a height h2 (e.g., almost half) smaller than the height h1 of the other side cutting edge 15. The side cutting edge 15 is referred to as "large side cutting edge", the side cutting edge 16 is referred to as "small side cutting edge".

Figure 13:
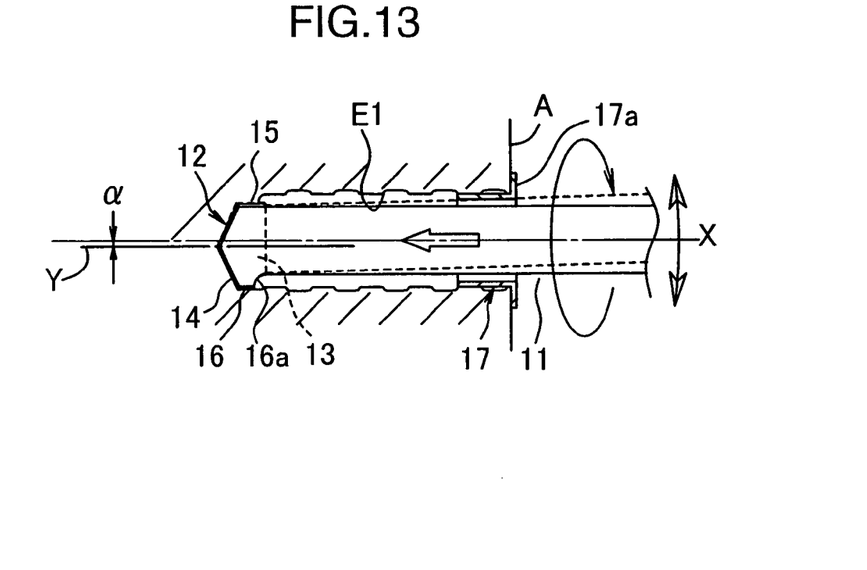
FIG. 13 is an illustration showing drilling using the drill shown in FIG. 11.
Figure 14:
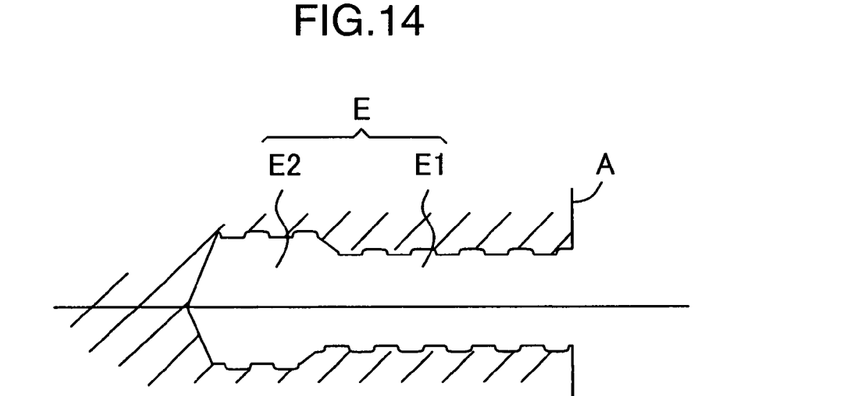
FIG. 14 is an illustration showing a finished state of the drilling.

According to this configuration, the small side cutting edge cuts deeply in the inner surface to thereby form greater irregularities in the inner surface of the hole, as shown in FIGS. 13 and 14. The formation of greater irregularities was experimentally confirmed by the inventor. This increases the fixing force of an anchor much greater.

Figure 12:
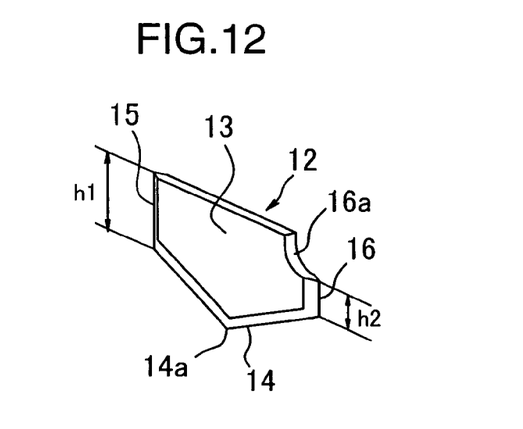
FIG. 12 is a perspective view of a tip attached on the drill shown in FIG. 11.

Also, as shown in FIG. 12, the tip 12 of this embodiment has a curved side edge 16a extending from a tailing end of the small side cutting edge 16 to thereby increase the load resistance of the small side cutting edge 16, and prevent the small side cutting edge 16 from being damaged. This was also confirmed by the inventor.

Furthermore, in this embodiment, a wall protector 17 having a flange 17a is movably attached on the main body 11 before the cutting, and is placed in the opening of the hole E1 after the cutting has been performed in a predetermined time. The following cutting is performed in the state where the flange 17a of the protector 17 covers a wall portion near the opening of the hole E1.

The wall protector 17 is made of a metal such as iron and aluminum, or hard plastic. The diameter of an outer periphery of a cylinder portion of the protector 17 is substantially the same as the inner diameter of the hole E1.

In this way, the wall protector 17 can protect the wall portion near the hole opening against the main body 11 of the drill, in particular, the drilling manner of performing cutting by turning or swinging the main body 11 to form the expanded distal end hole E2 as in the second embodiment, thereby preventing the wall portion near the opening of the preliminary hole C1 or the straight hole E1 from being damaged. Thus, the appearance of a wall surface near the hole can be maintained to be good.

By the way, the present invention may also be applied to a drill including a tip formed with a flat cutting portion having a cutting point projection at a center thereof, instead of the angular cutting portion. This modification has also the same advantageous effects as the above described embodiments.

As described above, a drill includes a main body and a high-hard tip attached to a front end of the main body. The tip has a width greater than a diameter of the main body, and an axial line of the tip is shifted in a width direction from an axis of the main body.

Also, it is preferable that the tip is formed with a cutting portion on a front end of a base portion attached to the main body, the cutting portion having an angular form whose vertex is a cutting point, and the cutting point is shifted in the widthwise direction from the axis of the main body.

Moreover, it is preferable that the tip has side cutting edges on both sides of the cutting portion, the side cutting edges protrude outward from a periphery of the main body, one of the side cutting edges has a greater protruding amount than the other, the side cutting edge having the greater protruding amount has a smaller height than the side cutting edge having the smaller protruding amount.

Moreover, it is preferable that the tip has a curved edge extending to a tailing end of the tip from the side cutting edge having the smaller height.

A wall protector comprises a cylinder portion movably placed on an outer periphery of the main body of the drill, and a flange portion operable to cover a wall portion near an opening of a hole to be cut by the drill.

A method for forming a hole in a wall, comprises the steps of forming a preliminary straight hole in the wall, and cutting a distal end of the preliminary straight hole by the drill to form a hole having an expanded distal end.

Another method for forming a hole in a wall, comprises the steps of forming a straight hole having a desired depth in the wall by the drill, and cutting an inner surface of the straight hole by inclining the drill with respect to an axis of the straight hole to form a hole having an expanded distal end.

Furthermore, it is preferable that before cutting the inner surface or the distal end of the straight hole, mounting a wall protector on the drill in a state that a cylinder portion of the wall protector is movably placed on an outer periphery of the main body of the drill, and a flange portion is made contact with a wall portion near an opening of the hole.

In the drill, the high-hard tip is attached in the center-off state to the main body. When performing the cutting, the tip makes an eccentric rotation, in other words, rotates while deviating from the rotation circle of the main body by the center-off distance. Accordingly, the rotation of the drill inside of the straight preliminary hole formed in advance to thereby forms an expanded distal end, thus enabling formation of a hole having the expanded distal end.

Alternatively, after forming a straight hole by this drill, a hole having an expanded distal end can be formed by inclining or turning the drill in the straight hole.

Therefore, in the case where a mechanical anchor method or a chemical anchor method is conducted, an anchor can be securely fixed in the thus formed expanded distal end hole. This makes it possible to further stabilize the attachment and supporting state of a device, a structure material or the like.

Furthermore, irregularities are formed over an entire inner surface of the expanded distal end hole, which can thus increase the fixing force of an anchor.

The shape of a tip is not limited into the above-mentioned shape. In the case of using a tip including an angular cutting portion, the cutting point, which is the vertex of the angular cutting portion, is shifted from the axis of the main body. The cutting point comes into contact with an inner wall of the distal end of the straight hole to thereby reduce the resistance of the eccentric rotation effectively. Accordingly, the tip can be easily eccentrically rotated, thereby helping cut an expanded distal end hole easily and smoothly.

Moreover, the side cutting edges are provided on the both sides of the tip, and are made to protrude outward by different amounts. One of the side cutting edges has a greater protruding amount than the other. The side cutting edge having the greater protruding amount has a smaller height than the side cutting edge having the smaller protruding amount. The side cutting edge having the greater protruding amount cuts deeply into the inner surface of the hole, so that noticeable irregularities are formed in the inner surface of the hole. This was experimentally confirmed by the inventor. These irregularities can increase the fixing force of an anchor much more.

In this case, the curved edge is formed in the portion extending to a tailing end of the tip from the side cutting edge having the smaller height, that is, the portion for supporting against the load applied to the side cutting edge. Accordingly, this curved edge can increase the load resistance of the side cutting edge, and prevent damage of the side cutting edge.

Moreover, the above described wall protector and drilling method, even if the drill is swung (particularly, it is swung by a person for the purpose of cutting an expanded distal end hole) during the cutting operation, the flange portion of the wall protector protects the wall portion near the opening of the hole to thereby protect the wall portion from being damaged. Thus, the wall surface having the good appearance can be maintained.

This application is based on patent application Nos. 2006-78085 and 2006-122796 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A drill comprising:
   a main body; and
   a high-hard tip attached to a front end of the main body, wherein the tip has a width greater than a diameter of the main body, an axial line of the tip is shifted in a widthwise direction from an axis of the main body, the tip is formed with a cutting portion on a front end of a base portion attached to the main body, the cutting portion has an angular form whose vertex is a cutting point, the cutting point is shifted in the widthwise direction from the axis of the main body, the tip has side cutting edges on both sides of the cutting portion, the side cutting edges protrude outward from a periphery of the main body, one of the side cutting edges has a greater protruding amount than the other, and the side cutting edge having the greater protruding amount has a smaller height than the side cutting edge having the smaller protruding amount.

2. The drill according to claim 1, wherein the tip has a curved edge extending to a tailing end of the tip from the side cutting edge having the smaller height.

3. The drill according to claim 1, wherein the side cutting edges are aligned substantially parallel to the axis of the main body.

4. A wall protector for use with a drill including a main body, a high-hard tip attached to a front end of the main body, the tip having a width greater than a diameter of the main body, an axial line of the tip being shifted in a widthwise direction from an axis of the main body, the tip being formed with a cutting portion on a front end of a base portion attached to the main body, the cutting portion having an angular form whose vertex being a cutting point, the cutting point being shifted in the widthwise direction from the axis of the main body, the tip having side cutting edges on both sides of the cutting portion, the side cutting edges protruding outward from a periphery of the main body, and one of the side cutting edges having a greater protruding amount than the other, the side cutting edge having the greater protruding amount having a smaller height than the side cutting edge having the smaller protruding amount, comprising:
- a cylinder portion which is movably placed on an outer periphery of the main body of the drill; and
- a flange portion which is operable to cover a wall portion near an opening of a hole to be cut by the drill.

5. The wall protector according to claim 4, wherein the tip has a curved edge extending to a tailing end of the tip from the side cutting edge having the smaller height.

6. The wall protector of claim 4, wherein the side cutting edges are aligned substantially parallel to the axis of the main body.

\* \* \* \* \*